United States Patent [19]
Alfrey, Jr. et al.

[11] 4,094,947
[45] June 13, 1978

[54] MULTILAYER COEXTRUSION PROCESS FOR PRODUCING SELECTIVE REFLECTIVITY

[75] Inventors: Turner Alfrey, Jr., Midland; Walter J. Schrenk, Bay City, both of Mich.

[73] Assignee: The Dow Chemical Company, Midland, Mich.

[21] Appl. No.: 720,481

[22] Filed: Sep. 3, 1976

[51] Int. Cl.² .............................................. B29F 3/06
[52] U.S. Cl. .................................. 264/171; 264/176 R; 425/131.1; 425/133.5
[58] Field of Search ................... 264/171, 173, 176 R, 264/40.6; 425/131.1, 133.5, 130

[56] References Cited

U.S. PATENT DOCUMENTS

| | | | |
|---|---|---|---|
| 3,072,962 | 1/1963 | McDermott et al. | 264/171 |
| 3,266,093 | 8/1966 | Corbett | 264/171 |
| 3,345,444 | 10/1967 | Pratt | 264/171 |
| 3,549,405 | 12/1970 | Schrenk et al. | 264/171 |
| 3,555,128 | 1/1971 | Schrenk | 264/171 |
| 3,565,985 | 2/1971 | Schrenk et al. | 264/171 |
| 3,576,707 | 4/1971 | Schrenk et al. | 264/171 |
| 3,743,460 | 7/1973 | Woolridge | 425/133.5 |
| 3,773,882 | 11/1973 | Schrenk | 264/171 |

Primary Examiner—Jeffery R. Thurlow

[57] ABSTRACT

Multilayer film or sheet prepared by coextrusion is extruded wherein the thickness of the inner layers is varied by varying the flow of one component to the central portion of the sheet while diverting that portion to an external portion of the sheet or film.

3 Claims, 6 Drawing Figures

MULTILAYER COEXTRUSION PROCESS FOR PRODUCING SELECTIVE REFLECTIVITY

Multilayer coextrusion has been employed to form sheets and film of plastic materials having unique properties. Two or more diverse synthetic resinuous materials are simultaneously extruded from a single die opening to form a layered structure; such a structure having found use in packaging applications. Such structures generally have from two to five layers of plastic material. Not all of the layers are necessarily diverse. Other multilayer coextruded films are known which exhibit selective reflectivity for light and employing an appropriate number of layers of suitable thickness and spacing and diversity of refractive index film exhibiting iridescence or selective reflectivity can be obtained. A variety of methods are known for the preparation of multilayer films having large number of layers. U.S. Pat. Nos. 3,487,505 and 3,557,265 disclose methods and apparatus for the preparation of multilayer film, that is, film having a sufficient number of layers to exhibit reflectivity. Other techniques for the manufacture of film having a large number of layers are set forth in U.S. Pat. Nos. 3,565,985; 3,576,707; 3,647,612 and 3,759,647. Films having a high degree of reflectivity and selective reflectivity are described in U.S. Pat. No. 3,711,176. A method and apparatus particularly suited for the preparation of reflective plastic films by the coextrusion process is set forth in U.S. Pat. Nos. 3,773,882 and 3,884,606. The teachings of the delineated U.S. patents are herewith incorporated by reference thereto. It is well recognized in the prior art that the apparent color or selective reflectivity of such multilayer plastic films may be readily altered by varying the thickness of the group or groups of layers responsible for reflectivity. For example, if multilayer film is being extruded it may be drawn or stretched to varying degrees to provide varying degrees of reflectivity or the absence of any undesirable degree of reflectivity. If on extrusion the film is selectively cooled prior to stretching, various colored patterns may be obtained. For small quantities of film, such procedures are satisfactory, however, when it is desired to produce large quantities of film which are to be handled in bulk, on large rolls, variation in thickness of the film is very undesirable in most film handling processes. A plastic film which is produced as a flat film or lay-flat film and of slightly varying thickness when wound unto a roll and stored may stretch or shrink to an extent sufficient that when unwound from the roll it is no longer a lay-flat film and oftentimes is processed through printing equipment and/or laminating equipment only with great difficulty.

It would be desirable if there were available an improved process for the preparation of multilayer reflective film wherein the reflectivity of the film could be readily altered without altering the thickness of the film.

It would also be desirable if there were available an improved apparatus for the preparation of multilayer reflective film wherein the reflectivity of the film could be readily varied without varying the thickness of the extruded film.

It would also be desirable if there were available an improved method and apparatus for the preparation of reflective plastic multilayer film wherein the feed extruders could be operated at a generally constant volumetric output and produce a film of varying reflectivity and generally constant thickness.

These benefits and other advantages in accordance with the present invention are achieved in a method for the preparation of a plastic film or sheet composed of a plurality of generally parallel layers, the parallel layers being generally parallel to the major surfaces of the film or sheet, the film being composed of at least two diverse synthetic resinuous materials arranged in layers in such a manner that selective reflectivity is obtained in the ultraviolet, infrared, or visible region of the electromagnetic radiation spectrum, the steps of the method comprising providing at least a first stream and a second stream of heat-plastified extrudable thermoplastic material, dividing the first stream into a plurality of first substreams and dividing the second stream into a plurality of second substreams, combining at least a major portion of the substreams to form a composite stream having at least a portion of the first substreams and the second substreams interdigitated, deforming the composite stream to a generally sheet-like configuration wherein the interfaces between the substreams are generally parallel to the major surfaces of the sheet-like configuration and at least one external surface of the substream being composed of material of the first stream, the number and thickness of the substreams being sufficient to provide a film or sheet having said reflectivity characteristics after cooling below the thermoplastic temperature, the improvement which comprises varying the reflectivity of the film or sheet by varying the quantity of material supplied to the interdigitated first substreams and a first substream forming an external surface of the sheet, the quantity of material provided for the first and second streams being maintained generally constant.

Also contemplated within the scope of the present invention is an apparatus for the preparation of a multilayer film or sheet, the apparatus adapted to prepare a film or sheet from at least two diverse synthetic resinuous materials, the sheet having a number and arrangement of layers such as to exhibit substantial reflectivity to light in the ultraviolet, visible, or infrared regions of the electromagnetic radiation spectrum, the apparatus comprising a body, the body defining at least a first polymer entrance passage, a stream dividing means to divide the material flowing from the first passage into a plurality of first substreams, a second polymer entrance passage discharging to the stream dividing means which divides the second stream into a plurality of second substreams and interdigitates the plurality of second substreams with the first substreams, the dividing means being in operative communication with a third or composite stream receiving means, the composite stream comprising the combined first and second substreams, the composite stream receiving means discharging to means defining a generally slot-like extrusion orifice wherein polymer of the first entrance passage forms at least one major surface of the film or sheet extruded from the die, the improvement which comprises means to selectively divert polymer from the first polymer entrance passage to or from the stream dividing means and to or from at least one major surface of the sheet or film when polymer is supplied at a generally constant rate to the first and second polymer entrance passages.

Further features and advantages of the present invention wil become more apparent from the following specification taken in connection with the drawing wherein.

Figure 5:
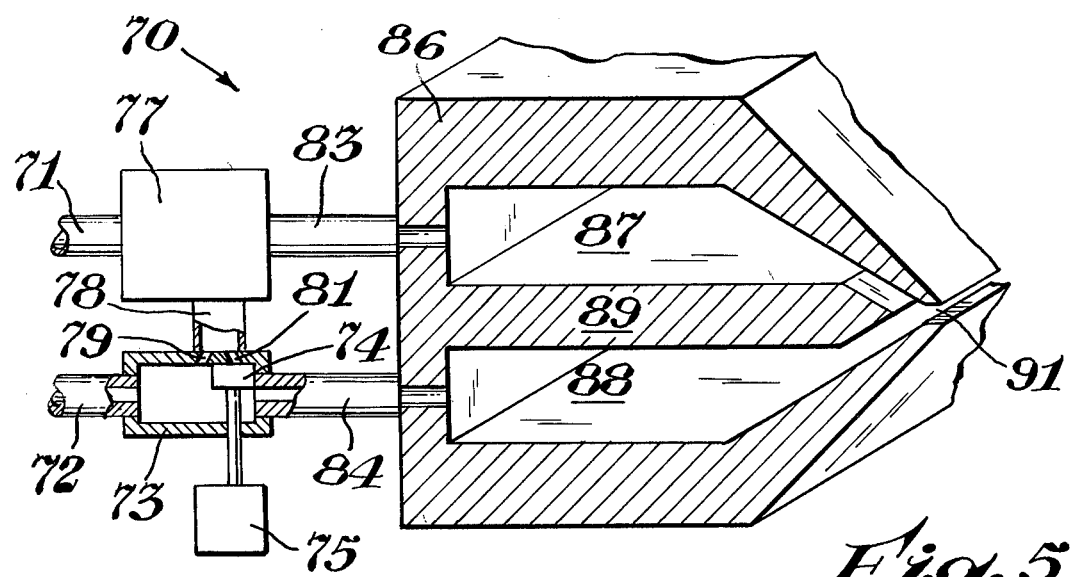
FIG. 5 depicts an alternate embodiment of the invention.
Figure 6:
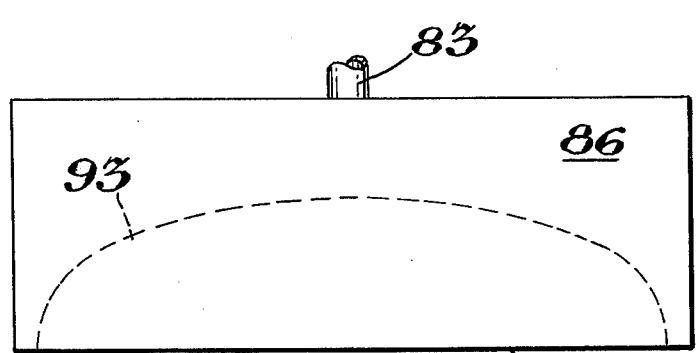

FIG. 6 schematically depicts a cavity configuration of a die as depicted in FIG. 5.

Figure 1:
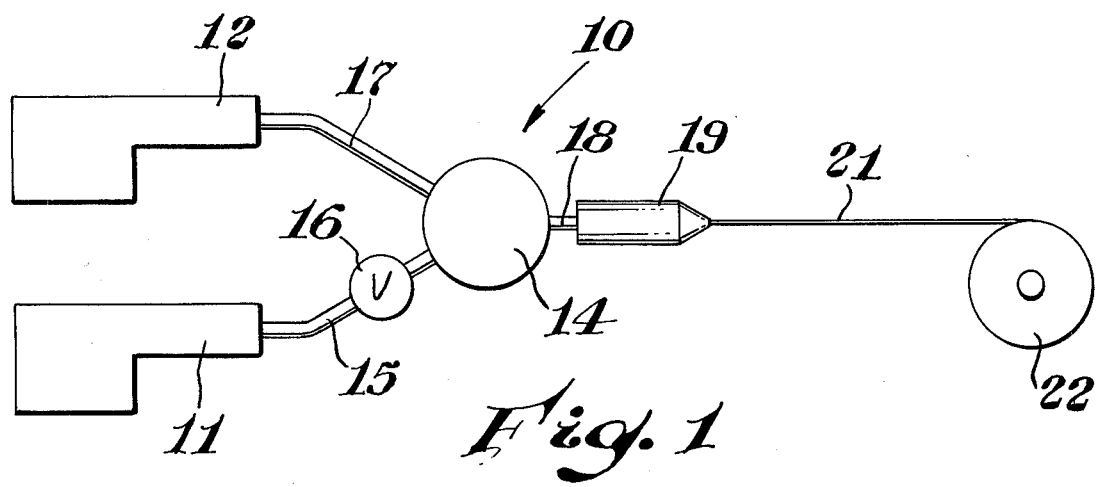
FIG. 1 is a schematic representation of an apparatus in accordance with the present invention.

In FIG. 1 there is schematically depicted an external view of an apparatus in accordance with the present invention generally designated by the reference numeral 10. The apparatus 10 comprises in cooperative combination a first source 11 of heat-plastified thermoplastic resinuous material such as an extruder and a second source 12 of a heat-plastified thermoplastic material of different refractive index than the material supplied by the source 11. The material supplied by the sources 11 and 12 are both generally transparent within the desired range of optical reflectivity desired. The source 11 is in operative communication with a stream arranging (dividing and recombining) means 14 through a conduit 15 and a means to selectively divert material from the first source 11 or valve 16. A conduit 17 provides communication between source 12 and the stream arranging means or feed block 14. Feed block 14 has a discharge 18 which is in communication with a means defining a generally slot-like extrusion orifice, a sheeting die 19 which is shown extruding a multilayered selectively reflective sheet 21 which in turn is wound unto a roll 22. In the apparatus of FIG. 1 material flowing from the sources 11 and 12 through the conduits 16 and 17 respectively enter the feed block or stream arranging means 14 wherein both streams are divided into a plurality of streams interdigitated and passed from the feed block 14 through the conduit or adaptor 18 into the die 19. In the die 19 a composite stream having a number of parallel layers is spread in such a manner that the interfaces between the layers are parallel or generally parallel to the major surfaces of the sheet 21.

Figure 2:
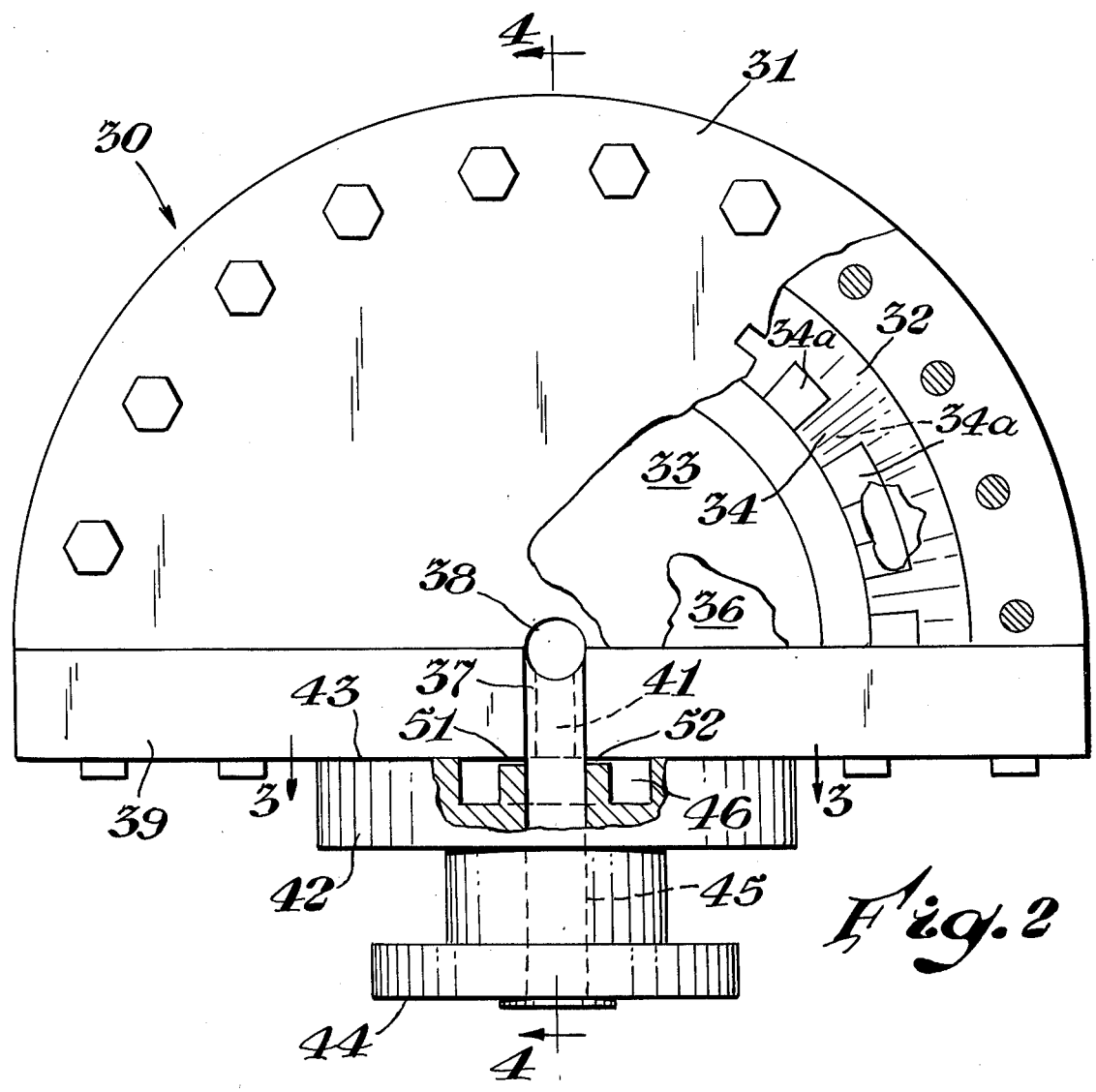
FIG. 2 is schematic partly-in-section representation of a stream dividing and recombining means in accordance with the present invention.
Figure 3:
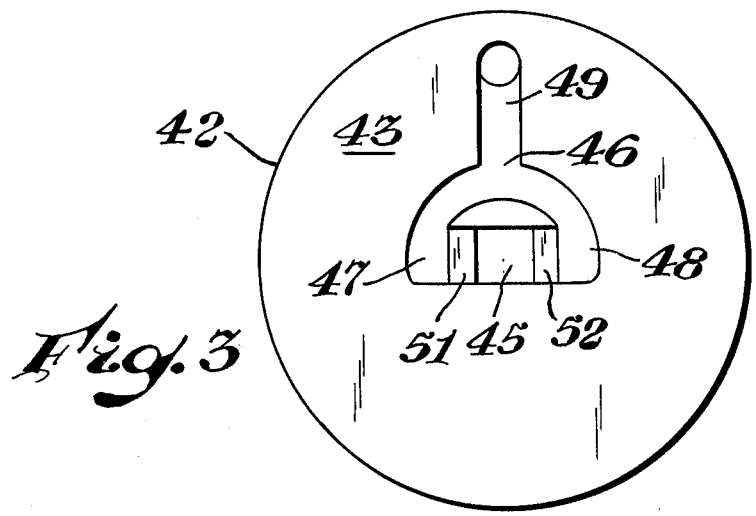
FIG. 3 is a view of a portion of the apparatus of FIG. 2 taken along the line 3—3 thereof.

In FIG. 2 there is schematically depicted a cut-away view of a stream arranging means designated by the reference numeral 30 which performs the function of dividing incoming streams, interdigitating the incoming streams and selectively diverting and dividing one feed between inner layers and the outer layers of the extruded stream. The stream arranging means 30 is of generally like construction to the stream arranging means of U.S. Pat. No. 3,884,606 but is semi-circular. Stream arranging means 30 comprises a body portion 31 defining therein a generally semicircular radially outwardly tapering plenum 32. The plenum 32 has disposed therein a flow distributor 33 of semicircular outwardly tapering configuration and a stream divider 34. The flow distributor 30 is generally symmetrical about a central plane lying in the plane of the illustration. The distributor 33 and stream divider 34 divide the plenum into two generally semicircular minor plenums each in communication with alternating slots or openings 34a within the stream divider 34. The flow deflector 33 defines a semi-circular slot or feed passage 36 lying in the plane of the paper and providing communication between a stream arranging means discharge passage 37 and alternating slots 34a formed in the stream divider 34. A first polymer inlet passage 38 is in communication with the plenum 32. A similar polymer inlet passage (not shown) is coaxially and oppositely disposed. A base 39 forms part of the body 31 and supports the flow director 33. A bypass channel 41 is disposed generally parallel a discharge passage 37 and is in communication with the polymer inlet passage not shown. A die adaptor 42 is affixed to the body 31. The die adaptor 42 has a first face 43 disposed adjacent to and in generally sealing engagement with the body 31 and has a second or die engaging face 44 generally parallel to and remotely disposed from the face 43. A polymer discharge passage 45 is defined within the adaptor 42 and provides full communication between the faces 43 and 44. The adaptor 42 defines an outer layer supply passage or recess 46 which is communication with the passageway 41. FIG. 3 shows a face view of the extrusion adaptor 42 taken along the line 3—3 of FIG. 2. The passageway 46 is of generally bifurcated configuration (FIG. 3) having a first arm 47, a second arm 48 and a base arm 49. The base arm 49 is in communication with the passageway 41 whereas the first arm and the second arm are in communication with the passageway 45 by means of the channels 51 and 52 formed between the passageway 45 and the arms 47 and 48.

Figure 4:
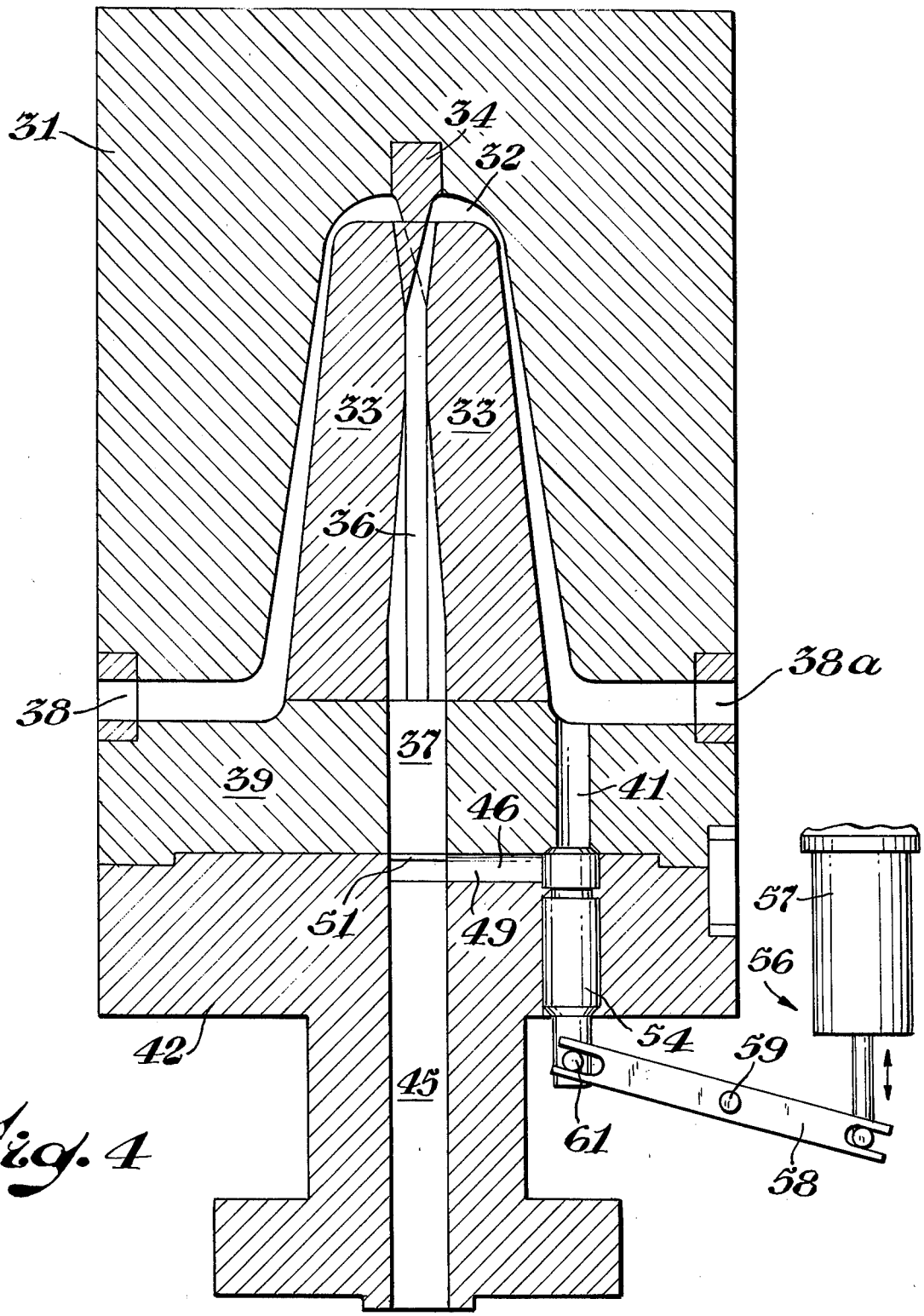
FIG. 4 is a sectional view of a stream dividing means of the general variety depicted in FIGS. 2 and 3.

In FIG. 4 there is depicted a sectional view of the flow distributor or feed block of FIG. 2 taken along the line 4—4 thereof showing the plenum 32 which contains the two-part flow director 33 and the relationship of the stream divider 34. The body 31 has a second polymer entrance passage 38a. Passage 38a is in communication with the bypass passageway 41 which in turn selectively communicates with the leg 49 of the passage 46 and discloses its relationship with the feed slot or passage 51. A valving member 54 is disposed within the extrusion adaptor 42. The valving member 54 provides selective communication between the passageway 41 and the leg 49 of channel 46. A valve actuating assembly 56 comprising an operating cylinder 57, a link 58 pivoting about a stub shaft or fulcrum 59 is operatively connected to the valving member 54. Opposite to the actuating cylinder 57 the arm or lever 58 engages the valving member 54 at a pivotal connection 61.

In operation of the stream arranging means as depicted in FIGS. 2 and 4 a heat-plastified synthetic resin is supplied at a constant rate to passageway 38 and the diverse resin to passage 38a, also at a constant rate. Polymer flows through the plenum 32 from each of the passages 38 and 38a, flows outwardly in a generally fan-like arrangement until it engages the flow divider 34 wherein each of the two streams are interdigitated, recombined and flow inwardly in passageway 36 defined within the flow director 33. The combined stream then flows radially inwardly to the discharge passage 37 where, as depicted in the figures it has a square configuration and has a plurality of layers parallel to the plane of the paper in FIG. 4 and perpendicular to the plane of the paper in FIG. 2. Assuming that the volumetric flows through the passages 38 and 38a are equal, the thickness of the layers in the passageways 37 and 45 is constant. When the valving member 54 is opened, it is depicted in the closed position in FIG. 4, polymer is diverted from the plenum 32 through the passageway 41 to the leg 49 of the channel 46 and flows through the passages 51 and 52 to provide what in effect is an increase in the thickness of the outer layers of the stream. The layers from the stream of the polymer entering the passage 38 remain constant while the thickness of the internal layers of the polymer from the passage 38a are decreased. Thus, when a flow arranging means or feed block such as the means 30 of FIGS. 2 and 4 is employed in an apparatus such as in FIG. 1 constant volumetric flow of the two polymers is maintained. Constant thickness of the extruded film also is maintained and thickness of the layers of the polymer from passageway 38a is varied depending upon the positioning of the valving member 54 to provide the desired alteration in the reflectivity of the extruded film. When apparatus in accordance with FIGS. 1 through 4 is employed and the composite stream from the passageway 45 is discharged to a single plenum die such as a coat-hanger die, the resultant film shows changes in apparent reflectivity which are arcuate, extend as arcuate parallel bands laterally across the film or sheet and are convex in the direction of extrusion. Oftentimes when employing apparatus in accordance with FIGS. 1 through 4 undesirable variations may occur in the thickness of the outer layers of the film resulting from an undesirable distribution of the material fed through passageways 51 and 52; for example, if the outer skin resulting from material flowing through passageway 51 or 52 is undesirably thin in the center of the extruded sheet, this can be corrected by altering the profile of the passageways. This is most easily accomplished by providing a removable insert in the die adaptor which can be shaped to give the desired flow results. In the case of a skin layer which is thin in the center and undesirably thick adjacent the edges of the extruded sheet, a passage such as the passage 51 or 52 is narrowed and deepened, thus initially depositing more material in the center of one face of the stream. Widening of the stream within the die results in a more uniform distribution. If the skin is undesirably thick in the center, a passage such as the passage 51 or 52 is restricted or made smaller in the center and increased or opened at the edges. Such an adjustment is a matter of trail and error until the desired distribution has been obtained.

In FIG. 5 there is depicted schematically an alternate fractional embodiment of the invention generally designated by the reference numeral 70. The apparatus comprises a first source of heat-plastified synthetic resin 71 and a second source of heat-plastified synthetic resin 72. The second source communicates with a valving chamber 73 having disposed therein a valving member 74, the valving member 74 being selectively positioned within the valving chamber by means of an actuator 75. The first source 71 is in direct communication with a stream arranging means 77. The stream arranging means 77 may be of generally identical configuration to that depicted in FIGS. 2 and 4. When the valving member 74 is in the closed position, stream arranging means 77 is in communication with the valving chamber 73 by means of feed conduit 78, and a first passageway 79 in the valving chamber 73. A second conduit 81 also within the valving chamber 73 is closed by valving member 74. The stream arranging means 77 has a discharge conduit 83 while the valving chamber 73 has a discharge conduit 84. Conduits 83 and 84 are in operative combination with a dual or twin plenum extrusion die 86. The extrusion die 86 has a first plenum 87 in communication with the conduit 83 and a second plenum 88 in communication with the conduit 84. The plenums 87 and 88 are separated by a plenum divider 89 which extends a distance about equal to the length and the entire width of the plenum 87 of the die 86. The die 86 has a slot-like extrusion orifice 91 remotely disposed from the conduits 83 and 84. Material from the plenums 87 and 88 is combined at a location adjacent the extrusion orifice or slot 91.

FIG. 6 depicts a plan view of the die 86 wherein the configuration of the plenums 87 and 89 is shown by the single dotted line designated 93. The operation of the apparatus 70 is generally similar to that of the apparatus of FIGS. 2, 3 and 4. When polymer is supplied from the sources 71 and 72 at constant volumetric displacement, a portion of the second polymer is diverted through passageway 79 into stream arrangement means or the feedblock 77 to provide a layered stream through the conduit 83 into the plenum 87 where it is spread and discharged from the extrusion slot 91. Polymer entering the valving means 73 is partially deflected through the passageway 79 and a portion of it through second plenum 88 of the die 86 to be combined at the terminal portion of the plenum divider 89 adjacent the slot or extrusion orifice 91 into a single stream and is discharged as a sheet which has a multilayered configuration adjacent one face and a relatively thick layer from the polymer of the second source 72 adjacent the opposite face. As the valving member 74 is moved downwardly, as in the configuration of FIG. 5, the passageway 81 is opened and the passageway in the conduit 84 is restricted. Thus, the proportion of the polymer of the second source in the reflective layers of the film supplied through the conduit 83 is increased and the amount of polymer or resin supplied to the second plenum 88 is reduced. Therefore, employing conventional principles for the flow of viscous, Newtonian or non-Newtonian, liquids desired reflectivity and changes in reflectivity are obtained which appear as a generally linear band extending normal to the direction of extrusion. If for the desired purposes an arcuate band is desired the embodiment of FIGS. 2 and 4 is employed. If a generally linear transverse band is desired, the embodiment of FIGS. 5 and 6 is selected.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the preparation of a plastic film or sheet composed of a plurality of generally parallel layers, the parallel layers being generally parallel to the major surfaces of the film or sheet, the film being composed of at least two diverse synthetic resinous materials arranged in layers in such a manner that selective reflectivity is obtained in the ultraviolet, infrared or visible region of the electromagnetic radiation spectrum, the steps of the method comprising providing at least a first stream and a second stream of heat-plastified extrudable thermoplastic material, dividing the first stream into a plurality of first substreams and the second stream into a plurality of second substreams, combining at least a major portion of the substreams to form a composite stream having at least a major portion of the first substreams and the second substreams interdigitated deforming the composite stream to a generally sheet-like configuration wherein the interfaces between the substreams are generally parallel to the major surfaces of the sheet-like configuration and at least one external surface of the substream being composed of material of the first stream, the number and thickness of the substreams being sufficient to provide a film or sheet having said reflectivity characteristics after cooling below the thermoplastic temperature, the improvement which comprises varying the reflectivity of the film or sheet by varying the quantity of material supplied to the combining of first and second substreams and a first substream forming an external surface of the sheet, the quantity of material provided for the first and second streams being maintained generally constant to thereby provide bands of apparent reflectivity extending laterally across the film or sheet.

2. The method of claim 1 including the step of combining the first substream forming an external surface with the composite stream prior to deforming the composite stream in a single plenum of a die into a generally sheet-like configuration to provide in the extruded film or sheet arcuate bands of varying reflectivity extending generally laterally across the extruded sheet.

3. The method of claim 1 including the step of combining the first substream, forming an external surface with the composite stream after deformation of both the composite stream in a first plenum of the die and the first substream, in a second plenum of a die forming an external surface to provide bands of reflective variation extending generally transversely to the direction of the extrusion.

* * * * *